United States Patent Office 3,717,499
Patented Feb. 20, 1973

3,717,499
ARTICLE WITH FILLED CAVITY
George R. McClure, Claymont, Del., assignor to E. I. du Pont de Nemours and Company, Wilmington, Del.
No Drawing. Filed Oct. 1, 1970, Ser. No. 77,311
Int. Cl. B32b 35/00
U.S. Cl. 117—72                                    14 Claims

ABSTRACT OF THE DISCLOSURE

An article comprising a substrate material having a cavity therein and two layers of resin occupying or filling the cavity is provided. One layer is an underlayer of a foamed resin and the second layer is a top layer of a specified resin. The two layers in the cavity provide a resistance to cracking the filling out of the cavity when the article is subjected to shocks.

BACKGROUND OF THE INVENTION

This invention relates to the filling of cavities with a composition comprising an underlayer of a foamed resin or a resin containing a high-bulk filler and a top layer of a resin.

It is known in the art that various resins can be used to fill cavities. However, a need exists for a composition for filling cavities that is inexpensive, has good resistance to cracking out of the cavity when it is subjected to shocks, dampens vibration and noise, has a small mass per unit volume and as well as this provides an aesthetic surface.

SUMMARY OF THE INVENTION

According to the present invention there is provided a composition occupying a cavity comprising:

(a) an underlayer of a foamed resin or resin containing a high bulk filler,
   the underlayer having a 10% compression deflection of at least about 5 pounds per square inch, and
   the resin being selected from the group consisting of polyurethane, epoxy, rubber, alkenyl aromatic, polyvinyl halide, silicone and phenolic, and
(b) a top layer of a resin selected from the group consisting of polyester, polyurethane, epoxy, modified epoxy composition, acrylic, rubber and cellulosic.

It has been found that the above composition is excellent for filling cavities that are present in practically any material. As well as this, the composition is inexpensive, has good resistance to cracking out of the cavity when it is subjected to shocks, dampens vibration and noise, has a small mass per unit volume and as well as this provides an aesthetic surface.

DESCRIPTION OF THE INVENTION

Underlayer of foamed resin

Essentially any foamable resin, including thermosetting or thermoplastic resins, can be used for the underlayer. Such foamable resin compositions consist of a predominant proportion of resin and a small proportion of a foaming (i.e. blowing or pore forming) agent that produces a gas thereby foaming the resin.

The foamed resin should be relatively rigid. That is, the foamed resin should have a 10% compression-deflection* of at least about 5 pounds per square inch (p.s.i.)

*10% compression deflection is the pressure in pounds per square inch required to compress the foam by 10% of its original thickness.

and preferably at least 20 p.s.i. Many of the foamed resins useful in this invention have a 10% compression deflection of about 40–300 p.s.i.; however, the foamed resins can have a 10% compression deflection of 300–1200 p.s.i. or even higher.

Ordinarily, the foamed resin will have a density of at least about 1 pound per cubic foot. Often it will have a density of 3–10 pounds per cubic foot, but of course can be higher, i.e. 20 or 30 pounds per cubic foot or even higher.

Suitable foaming agents for the foamable resin compositions are well known in the art and the selection of the particular foaming agent to be employed will generally be determined by the particular resin in which it is to be incorporated. The foaming agent can be a material that volatizes to a gas or a material that produces a gas by a chemical reaction. Examples of foaming agents that volatize to a gas include hydrocarbons such as propane, butane, pentane, hexane, heptane, petroleum ether, cyclopentane, and other organic compounds such as acetone, methanol, ethyl acetate, etc., and halocarbons such as $CCl_3F$, $CCl_2F$—$CClF_2$, $CCl_2F_2$, $CH_2Cl_2$, etc. Examples of foaming agents that produce a gas by chemical reaction include water (incorporated for example in the making of polyurethanes to liberate $CO_2$), reaction of an acid with a material that will liberate $CO_2$ such as sodium bicarbonate, azoisobutyronitrile, N,N'-dimethyl-N,N'-dinitroterephthalamide and the like.

The following will describe in more detail the resins that are suitable for forming the underlayer.

Foamed polyurethane resins

A preferred foamed resin is polyurethane. Polyurethanes are well known and are the reaction product of a polyisocyanate and an active hydrogen containing compound.

The polyisocyanate used is preferably toluene diisocyanate although other polyisocyanates such as m-phenylene diisocyanate, methylenebis(phenyl isocyanate), polymethylenepolyphenylisocyanate, tetramethylene diisocyanate, hexamethylene diisocyanate, and similar organic polyisocyanates may be suitably employed. The polyisocyanate may also be employed in the form of a prepolymer which comprises the reaction product of an excess of the polyisocyanate and an active hydrogen containing compound.

Suitable active hydrogen containing compounds include water, polyols, hydroxyl containing polyesters, hydroxyl containing polyethers, polyamines, and the condensation product of active hydrogen containing compounds and alkylene oxides.

Hydroxyl containing polyethers incluude, for example, polyethyleneether glycol, polypropyleneether glycol, polytetramethyleneether glycol, polyhexamethyleneether glycol, polyoctamethyleneether glycol, polynonamethyleneether glycol, polydecamethyleneether glycol, polydodecamethyleneether glycol and mixtures thereof. Polyethers containing several different radicals in the molecular chain such as, for example, the compounds

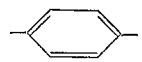

wherein $R_1$, $R_2$ and $R_3$ can be the same as each other or different than each other and can be H, alkyl such as methyl, ethyl or propyl, or aryl such as

and wherein $n$ is greater than 1, can be used.

Hydroxyl containing polyesters which can be used instead of or in conjunction with the hydroxyl containing polyethers are, for example, those formed by reacting acids, esters or acid halides with glycols. Suitable glycols are polymethylene glycols such as ethylene, propylene, tetramethylene, decamethylene glycols, substituted polymethylene glycols, such as 2,2-dimethyl-1,3-propanediol and cyclic glycols such as cyclohexanediol. These glycols are reacted with aliphatic, cycloaliphatic or aromatic dicarboxylic acids or lower alkyl esters or ester forming derivatives thereof. Acids for preparing such polyesters are, for example, succinic, adipic, suberic, sebacic, terephthalic and hexahydroterephthalic acids and the alkyl and halogen substituted derivatives of these acids.

Suitable polyols include those glycols that are listed above for forming hydroxyl containing polyesters and polyols containing more than two hydroxyl groups per molecule such as 1,2,6-hexane triol.

Other active hydrogen containing compounds include sucrose, sorbitol, alpha-metyl glucose, mannitol, erythritol and pentaerythritol.

Suitable polyamines include diethylene triamine, polypropylene glycol diamine, meta-phenylene diamine, methylene dianiline, methylene dicyclohexyl amine and oxydianiline.

Preferred active hydrogen containing compounds are the condensation products of alkylene oxides such as ethylene oxide, propylene oxide and the like with an active hydrogen containing compound. Especially preferred are the condensation products of alkylene oxides with active hydrogen containing compounds such as glycerine, sorbitol, trimethylolpropane, ethylene diamine, sucrose, mannitol, erythritol, pentaerythritol or alpha-methyl glucose.

Suitable catalysts include tertiary amines and tin salts. Preferred blowing agents are $H_2O$, $CCl_3F$, $CCl_2F_2$, $CCl_2F$—$CClF_2$ or hydrocarbons such as propane, butane or mixtures of hydrocarbons with methylene chloride.

Foamed alkenyl aromatic resins

The foamed resin can be an alkenyl aromatic compound, i.e. containing at least about 50% by weight of at least one alkenyl aromatic compound having the general formula G—CX=CH$_2$ wherein G is an aromatic radical or substituted aromatic radical and X is selected from the group consisting of a hydrogen atom and a CH group. Examples of alkenyl aromatic compounds include polymers, copolymers and interpolymers or graft copolymers of styrene, α-methyl styrene, vinyl toluene, mono and dichloro styrene and ar-dimethyl styrene and the like. Preferred is polystyrene having incorporated therein as a foaming agent a volatile, nonreactive, organic liquid which has only a slight solvent action on the polystyrene such as pentane, hexane, heptane, petroleum ether, cyclopentane, acetone, methanol, ethyl acetate, dichloroethylene, etc.

Foamed epoxy resins

The foamed resin can be an epoxy resin that has been converted to thermoset form by the use of a catalyst and/or heat. Generally, the epoxy resin i.e. the epoxy compound before converted to thermoset form, will have an average of from about 1.5 to about 4 epoxy radicals per molecule and preferably from about 1.8 to about 3.5 epoxy radicals per molecule.

The preferred epoxy resins for use in this invention are the complex epoxy-hydroxy polyethers which are obtained by the catalyzed condensation of polyhydric phenols or alcohols with an epoxy-contributing compound such as epihalohydrins and alkylene oxides as described in U.S. Pat. Nos. 2,456,408 and 2,592,560. Typical polyhydric phenols include the mononuclear phenols such as resorcinol, catechol and hydroquinone and the polynuclear phenols such as bis-(4-hydroxyphenyl)methane, 2,2-bis-(4-hydroxyphenyl)propane (also known as bisphenol A) and 2,2-bis-(4-hydroxy-2-methylphenyl)propane. Typical polyhydric alcohols include ethylene glycols glycerine and trimethylol propane. Epichlorohydrin is the preferred epoxy-contributing compound.

Preferred epoxy resins suitable for use in this invention include those having the formulas:

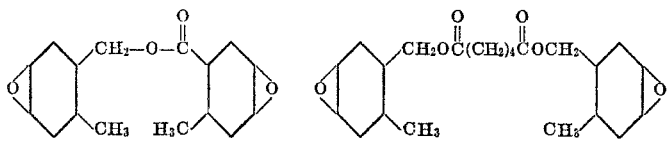

Particularly preferred epoxy resins are those obtained by the reaction of bisphenol A and epichlorohydrin (such reaction products hereinafter referred to as the diglycidyl ether of bisphenol A or DGEBA). The formula of DGEBA may be expressed as follows:

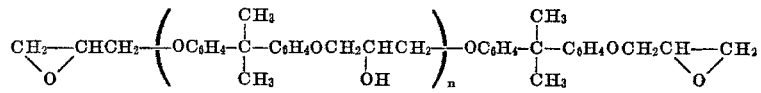

where $n$ has an average value from 0 to about 10. Generally, $n$ will be no greater than 2 or 3, and preferably has an average value of 0 through 1.

To change the epoxy resin to a useful thermoset form, catalysts are used. Most useful catalysts are polyamines such as diethylene triamine or triethylene tetramine.

Foamed phenolic resins

The foamed resin can be a phenolic resin, i.e. a synthetic thermosetting resin obtained by the condensation of phenol or substituted phenols with aldehydes such as formaldehyde, acetaldehyde and furfural. Generally, the phenolic resins will contain about 1.2–3 moles of aldehyde per mole of phenol or substituted phenol. If desired, as is known in the art, the phenolic resins can be modified by the addition of compounds containing alcoholic hydroxols or reactive hydrogens such as polyvinyl alcohol, ethylene glycol or glycerol.

Generally, catalysts used to form the phenolic resins will be acidic or basic. If desired, there can also be used in conjunction with the catalyst, crosslinking agents such as those described in Proctor and Katz U.S. Pat. No. 2,806,006 issued Sept. 10, 1957, a disclosure of which is hereby incorporated by reference.

Foamed silicone resins

The foamed resin can be a silicone resin. Such silicone resins include polyorganosiloxanes having the general structure

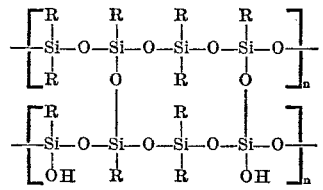

wherein $n$ is a high enough number to give the foamed resin a 10% compression-deflection of at least 5 p.s.i., i.e. a high enough number to give a molecular weight of at least about 20,000, and R is a hydrocarbon radical including for example alkyl (such as methyl) or phenyl.

Foamed polyvinyl halide resins

The foamed resin can also be a polyvinyl halide, e.g. vinyl chloride or vinyl bromide. If desired, the vinyl halide can be copolymerized with another monomer containing the vinylidene group such as vinyl acetate.

If desired there may be incorporated in the polyvinyl halide foam plasticizers such as esters of acids including phthalic, sebacic, isophthalic, or epoxy plasticizers as described in Newey U.S. Pat. No. 2,795,565.

Foamed rubber

The foamed resin can also be rubber such as styrene/butadiene, acrylonitrile/butadiene, neoprene (i.e., polymers of chloroprene), polybutadiene, polyisoprene, or butyl rubber (i.e., isobutane copolymerized with about 2% isoprene or butadiene). Normally, the above rubbers will be compounded with about 30–50% sulfur to give them the desired rigidity.

Underlayer of resin containing a high bulk filler

As an alternative method of obtaining a low density resin material, in lieu of foaming the resin, one may incorporate in any of the above-described resins used to form the underlayer, at least one suitable high bulk filler, such as small hollow particles (hollow particles being meant to include a particle having a honey-comb like structure or a particle containing a void or voids) of glass, silica, expanded volcanic ash, thermoplastic resin or thermoset resin. Examples of thermoplastics include particles of expanded saran, nylon, polyethylene, acrylonitrile/butadiene copolymers; examples of thermosets include phenol/formaldehyde epoxy, polyester, etc. Ordinarily, the high bulk fillers will be present in an amount of about 20–175% and preferably 90–130% (the foregoing percentages being percent by volume of the resin).

The top layer

The top layer can be any resin that does not shrink appreciably upon curing and has the strength, toughness and smoothness for the application desired. As well as this the top layer should be adhered well to the material being filled and also preferably, the underlayer. In most situations the top layer itself will provide this adhesion. However, for some materials to be filled, it may be desirable to use an adhesion promoting compound or an adhesive to obtain good adhesion between the top layer and the material being filled and the underlayer.

The top layer can be a resin of polyester, polyurethane, epoxy, modified epoxy composition as described and claimed in U.S. patent application, Ser. No. 18,694 filed Mar. 11, 1970, now abandoned in favor of continuation-in-part application Ser. No. 114,661, filed Feb. 11, 1971, or acrylic, rubber or cellulosic. Preferred are epoxy, modified epoxy, and polyester. The resins of polyurethane, epoxy and rubber are the same as previously described under the description of the "Underlayer of foamed resin," but with the exception that the resin is not foamed. The other resins will be described in more detail in the following.

Modified epoxy composition

The top layer can be a modified epoxy resin described and claimed in U.S. patent application, Ser. No. 18,694 filed Mar. 11, 1970, the disclosure of which is hereby incorporated by reference. Such composition comprises:

[A] 5–40% by weight of a polymer containing epoxy radicals (said weight percentages based on the combined weight of the polymer containing epoxy radicals and the epoxy resin described below in [B]) said polymer containing epoxy radicals produced by admixing
  [1] at least one polymer selected from the group consisting of
    (a) acrylonitrile / butadiene copolymers formed from about 5–45% by weight based on the entire weight of the copolymer of acrylonitrile, and about 55–95% by weight based on the entire weight of the copolymer of butadiene;
    (b) acrylic polymers that are (i) homopolymers, copolymers, or mixtures of homopolymers and copolymers formed from monomers having the formula

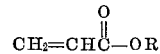

wherein R is equal to alkyl of 2 through 8 carbon atoms, or (ii) copolymers formed from up to about 30% by weight, based on the total weight of the copolymer, of methyl methacrylate and monomers having the formula

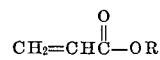

wherein R is equal to alkyl of 4 through 8 carbon atoms, or (iii) mixtures of the acrylic polymers above described in (i) and (ii);
    (c) polyesters; and
    (d) polyalkyleneethers,
  said polymers characterized by
    (1) having an average of more than 1 radical per molecule, said radical selected from the group consisting of

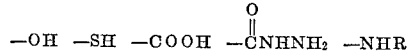

wherein R is equal to H or alkyl of $C_1$ through $C_6$ and wherein at least one of the above radicals is located on a terminal position on the polymer molecule,
    (2) having a number average molecular weight of above about 1,000 when the polymer is a polyalkylene-ether and having a number average molecular weight of above about 2,000 when the polymer is an acrylonitrile/butadiene copolymer, an acrylic polymer or a polyester,
    (3) having a glass transition point below about —25° C., and
    (4) having a solubility parameter between about 8 and 10.5 and
  [2] at least one epoxy resin characterized by having an average of at least 1.8 epoxy radicals, at a temperature and for a time sufficient to produce said polymer containing epoxy radicals,
[B] 95–60% by weight of an epoxy resin (said weight percentages based on the combined weight of the epoxy resin and the polymer containing epoxy radicals described above in [A]) said epoxy resin characterized by having an average of at least about 1.8 epoxy radicals per molecule.

Preferred for forming the polymer containing epoxy radicals above described in [A] are the acrylonitrile/butadiene copolymers.

Polyester resin

The top layer can be a polyester resin. Preferably such polyester resins are formed by the polymerization of unsaturated polyesters with a polymerizable monomeric solvent, the unsaturated polyesters being in solution in such solvent.

The unsaturated polyester is ordinarily formed by the esterification of glycols with dicarboxylic acids or acid anhydrides, at least a portion of such acids or anhydrides containing ethylenic unsaturation. Suitable dicarboxylic acids or acid anhydrides containing ethylenic unsaturation include maleic acid, maleic anhydride, fumaric acid and the like. Suitable dicarboxylic acids or acid anhydrides that are free of ethylenic unsaturation include phthalic acid, isophthalic acid, terephthalic acid, adipic acid, succinic acid, phthalic anhydride and the like.

The unsaturated polyester is dissolved in a polymerizable monomer such as the alkenyl aromatic compounds defined previously under the heading "Foamed alkenyl aromatic resins," esters of acrylic acid or methacrylic acid formed from alkanols having 1 through 20 carbon atoms such as methyl acrylate or methacrylate, ethyl acrylate or methacrylate, propyl acrylate or methacrylate, isopropyl acrylate or methacrylate, the various butyl acrylates or methacrylates, 2-ethylhexyl acrylate or methacrylate, n-hexyl, n-octyl, t-octyl, lauryl, hexadecyl, or octadecyl acrylates or methacrylates, and the like. A typical composition comprises about 20–50 parts by weight of styrene and 80–50 parts by weight of unsaturated polyester.

When the above solutions of unsaturated polyesters are cured with a suitable catalyst such as benzoyl peroxide, they form hard thermoset resins.

Acrylic resin

The top layer can be acrylic resin that is a homopolymer, copolymer or mixtures of homopolymers and copolymers formed from monomers having the formula

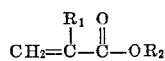

wherein:
$R_1 = H$ or $-CH_3$
$R_2 = H$ or alkyl of 2–20 carbon atoms, i.e. compounds including the esters of acrylic acid or methacrylic acid above defined under the heading "Polyester resin."

Cellulosic resin

The top layer can also be cellulosic resins, which are well known in the art such as methyl cellulose, ethyl cellulose, cellulose acetate and the like.

The fillers

If desired, they may be incorporated in the above-described resins used to form the top layer about 0.5–175% (by volume of the resin) of at least one suitable filler. The filler can be high bulk or can be low bulk.

Suitable high bulk fillers include small hollow particles (hollow particles being meant to include a particle having a honey-comb like structure or a particle containing a void or voids) of glass, silica, expanded volcanic ash, thermoplastic resin or thermoset resin. Examples of thermoplastics include particles of expanded saran, nylon, polyethylene, acrylonitrile/butadiene copolymers; examples of thermosets include phenol/formaldehyde, epoxy, polyester, etc.

Examples of suitable low bulk fillers include particles of titanium dioxide, calcium carbonate, barium titanate, potassium titanate, magnesium sulfate, asbestos, mica, $Fe_3O_4$, $Fe_2O_3$, aluminum, alumina, silica, etc. As examples of silica, there can be mentioned "Ludox" colloidal silica, "Cab-O-Sil" colloidal silica, "Celite" diatomaceous silica and "Hi-sil" silica (a hydrated silica).

A preferred filler is small hollow spheres (i.e. microballoons) of glass or silica.

Ordinarily, if a high bulk filler is used, it will occupy about 90–130% by volume of the resin; ordinarily, if a low bulk filler is used, it will occupy about 10–50% by volume of the resin.

Preferably, the top layer will contain a suitable filler since it ordinarily will improve the sandability and shapeability of the top layer and furthermore will decrease the cost of the top layer.

The process

Ordinarily, the cavity to be filled will be first partially filled with the underlayer of foamed resin or resin containing a high bulk filler. Because in practice cavities are often irregular in shape it is often desirable to form the underlayer in place, i.e. place the resin in the cavity and then allow it to cure (and foam if a foamed resin is desired) to thus fill the contours of the cavity. If desired, however, the underlayer can be preformed and then placed in the cavity.

After the underlayer has hardened, it is covered with the top layer. Since the top layer ordinarily has greater strength than the underlayer, the top layer will occupy enough of the depth of the cavity to give the patch comprising the top layer and underlayer the desired strength. Ordinarily, the top layer will occupy from ½ to about ⅛ of the entire depth of the cavity, but of course can be less or greater than this depending on the requirements of the material being patched, the composition of the top layer and underlayer and the like. Also for some applications, as for example for decorative effects or even some function reasons, e.g., to retain a depression in the material being patched, it may be desirable to not fill the cavity completely with the compositions of this invention. Thus, for the purposes of this invention, when it is stated that the composition of this invention occupies a cavity, this means that such composition fills enough of the depth of the cavity for the requirements of material being patched.

After the top layer has hardened, it is finished. For some applications, no further treatment is needed since often the top layer before it has hardened can be smoothed or shaped to the required form. However, if need be, the top layer can be further smoothed by sanding, filing, etc.

After the smoothing operation, if desired, the top layer can be painted.

For the purpose of this invention, a cavity is meant to be any imperfection in the surface of a material such as dents, cuts, grooves, depressions, holes, rusted out portions, scratches and the like. Cavity is also meant to include the depression that exists after the joining of pieces of material, such as the depression that exists after pieces of sheet metal in an auto body have been welded together (including joints often referred to in the auto trade as coach joints and lap joints).

The composition of this invention can be used to fill cavities to the desired level. The cavities can be in most any material such as metal including steel, iron, aluminum, wood, plastic, plaster, masonry and the like.

The following examples illustrate the invention. All parts and percentages are by weight unless otherwise specified.

EXAMPLE 1

An underlayer of foamed polyurethane resin was prepared by mixing portions A and B.

PORTION A

| Ingredient | Parts |
|---|---|
| Sorbitol based polyether glycol [1] (reaction product of sorbitol and propylene oxide and ethylene oxide, the polyether chain attached to the sorbitol molecule formed from about 90% by weight propylene oxide and about 10% by weight ethylene oxide, the predominate amount of the terminal portion of the polyether chain formed from ethylene oxide) | 27.6 |
| Glycerine based polyether glycol [2] (reaction product of glycerine and propylene oxide and ethylene oxide, the polyether chain attached to the glycerine molecule formed from about 90% by weight propylene oxide and about 10% by weight ethylene oxide, the predominate amount of the terminal portion of the polyether chain formed from ethylene oxide) | 1.1 |
| Distilled water | 0.14 |
| Silicone surfactant [3] | 0.43 |
| Catalyst of triethylene diamine [4] (20 weight percent triethylene diamine in alkanol amine solvent) | 0.22 |

PORTION B

| | |
|---|---|
| Undistilled toluene diisocyanate containing 34 weight percent NCO [5] | 21.6 |

[1] Atapol 2450, Atlas Chemical Industries.
[2] Voranol CP-4701, Dow Chemical Company.
[3] Dow Corning 193.
[4] DABCO R-8020, Houdry Process & Chemical Company.
[5] Hylene TRF, Du Pont.

The admixture of portions A and B was then poured into depressions in metal panels that simulated dents in autobody sheet metal. The foaming was complete in about 3 minutes and after 10 minutes the foam was hard. The hard foam occupied about 70–80% of the depth of the depressions; such hard foam had a 10% compression deflection of about 300 p.s.i. and a density of about 10 pounds per cubic foot.

A modified epoxy resin composition to be used for making the top layer was then made in accordance with the teachings of U.S. patent application Ser. No. 18,694. A 2-liter flask equipped with stirrer, thermometer and $N_2$ inlet was charged with 750 grams (3.75 equivalents of epoxy) of diglycidyl ether of bisphenol A having an average value of about $n=0.14$ ("Epon 826" available from Shell Chemical Co.). To this was added 250 grams (0.175 equivalent of carboxyl) of an acrylonitrile/butadiene copolymer having an average of 2.34 carboxyl radicals per molecule with an average of 1.7 of these radicals being situated on terminal positions on the molecule, a number average molecular weight of about 3,360, a glass transition point of about −55° C., a solubility parameter of about 9.5 and formed from about 20 weight percent acrylonitrile and about 80 weight percent butadiene (the weight percentages being based on the combined weight of the acrylonitrile and butadiene). The copolymer is designated "Hycar CTBNX" (available from B. F. Goodrich Company). The equivalent weight ratio of epoxide to carboxyl was about 21:1. After the above admixture was heated under nitrogen, with stirring, to maintain a temperature of about 150° C. for about one hour, it was allowed to cool.

The top layer was then prepared by mixing portions C and D.

PORTION C

| Ingredient | Parts |
|---|---|
| Modified epoxy resin composition (above described reaction product of "Epon 826" epoxy resin and "Hycar CTBNX" acrylonitrile/butadiene copolymer) | 35.9 |
| Trialkoxy aminoalkyl silane [1] | 0.25 |
| Hollow glass spheres [2] (90% having a size of about 20–120 microns in diameter) | 12.5 |
| Purified asbestos [3] | 1.5 |

PORTION D

| Ingredient | Parts |
|---|---|
| Catalyst [4] | 7.5 |

[1] Silane A-1100, Union Carbide.
[2] Glass bubbles B-40-B, 3M Company.
[3] Calidria RG-144, Calidria Asbestos Company.
[4] ZZLA-0372, Union Carbide, believed to be a mixture of phenol and aminoethylpiperazine.

The admixture of Portions C and D (in the form of a smooth paste) was then used to fill the remaining 20–30% of the depressions in the metal panels. The panels were then exposed to room temperature (about 25° C.) for two hours.

The filled surface on one of the panels was then sanded and painted. The filled area was not distinguishable from unfilled area.

Other filled panels were then subjected to tests the results of which showed that the exposed surface of the fill could withstand an impact of at least 60 inch pounds without cracking, that the non-exposed portion of the fill (i.e. a reverse impact striking the portion of the sheet metal that has attached to the other side of it the fill) could withstand an impact of at least 80 inch pounds, without the exposed surface cracking and that the fill could withstand at least about 100 hours of a vibration test where one edge of the fill was held stationary and a portion of the fill about 1 inch away was deflected 0.030 inch at a rate of 300 minutes$^{-1}$, while the temperature was cycled between 150° F. and −50° F.

EXAMPLE 2

Portions A and B were mixed to produce a polyurethane foam that was poured into dented sheet metal panels so that after expansion was complete, the lower 70–80% of the depth of the dents were filled.

PORTION A

| Ingredient | Parts |
|---|---|
| Sucrose based polyether glycol [1] (reaction product of sucrose and propylene oxide and ethylene oxide, the polyether chain attached to the sucrose molecule formed from about 90% by weight propylene oxide and about 10% by weight ethylene oxide, the predominate amount of the terminal portion of the polyether chain formed from ethylene oxide) | 41.40 |
| Silicone surfactant of Example 1 | 0.64 |
| Fluorotrichloromethane | 1.20 |
| Triethylene diamine solution of Example 1 | 0.20 |

PORTION B

| | |
|---|---|
| Undistilled toluene diisocyanate of Example 1 containing 34 weight percent NCO | 31.90 |

[1] Voranol RG-340, Dow Chemical Company.

After about 10 minutes the foam was hard. The hard foam had a 10% compression deflection of about 900 p.s.i. and a density of about 20 pounds per cubic foot.

The top layer of the fill was prepared by mixing portions C and D.

PORTION C

| Ingredient | Parts |
|---|---|
| Polyester from 37.6% phthalic acid, 26.2% maleic acid, and 36.2% propylene glycol (the percentages based on the weight of the polyester) | 14.00 |
| Styrene | 11.00 |
| Dimethyl aniline | 0.01 |
| Talc | 25.00 |

PORTION D

| Ingredient | Parts |
|---|---|
| Benzoyl peroxide | 0.50 |
| Dimethyl phthalate | 0.50 |

The remainder of the depth of the dents were filled with the admixture of Portions A and B.

After about 15 minutes one of the filled portions of the panels was sanded and painted. The filled portion was not detectable from the unfilled portion.

Another panel was subjected to the reverse impact test of Example 1 and the vibration test of Example 1. The results were that the fill could withstand a reverse impact of at least about 30 inch pounds and a vibration test of at least about 3 hours.

What is claimed is:

1. An article comprising a substrate material having a cavity therein and two layers of resin occupying said cavity, one layer being
   (A) an underlayer which is a foamed resin having a 10% compression deflection of at least about 5 pounds per square inch and which is:
      (1) a polyurethane resin,
      (2) an epoxy resin,
      (3) a rubber consisting essentially of styrene/butadiene, acrylonitrile/butadiene, neoprene, polybutadiene, polyisoprene, isobutane/isoprene, or isobutane/butadiene,
      (4) an alkenyl aromatic resin consisting essentially of a polymer or copolymer of an alkenyl aromatic compound having the formula

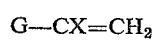

$$G\text{---}CX\text{=}CH_2$$

wherein G is an aromatic radical or a substituted aromatic radical and X is hydrogen or —CH group,
      (5) a polyvinyl halide resin,
      (6) a silicone resin, or
      (7) a phenolic resin;
   and the second layer being
   (B) a top layer which is:
      (1) a polyester resin,
      (2) an epoxy resin,
      (3) a modified epoxy composition which comprises 95–60% by weight of an epoxy resin having an average of at least about 1.8 epoxy radicals per molecule and 5–40% by weight of a polymer containing epoxy radicals produced by admixing an epoxy resin having an average of at least about 1.8 epoxy radicals with
   (a) an acrylonitrile/butadiene copolymer,
   (b) an acrylic polymer,
   (c) a polyester, or
   (d) a polyalkyleneether,
(4) an acrylic resin,
(5) a rubber as defined above, or
(6) a cellulosic resin,
said top layer occupying about ½–⅛ of the entire depth of the cavity.

2. The article of claim 1 wherein the top layer comprises epoxy.

3. The article of claim 2 wherein the underlayer comprises a foamed resin of polyurethane.

4. The article of claim 2 wherein the top layer contains 0.5–175%, by volume of the epoxy resin, of filler.

5. The article of claim 4 wherein the underlayer comprises a foamed resin of polyurethane.

6. The article of claim 1 wherein the top layer comprises the modified epoxy composition.

7. The article of claim 6 wherein the underlayer comprises a foamed resin of polyurethane.

8. The article of claim 6 wherein the top layer contains 0.5–175%, by volume of the modified epoxy composition, of filler.

9. The article of claim 8 wherein the underlayer comprises a foamed resin of polyurethane.

10. The article of claim 1 wherein the top layer is comprised of polyester.

11. The article of claim 10 wherein the underlayer comprises a foamed resin of polyurethane.

12. The article of claim 10 wherein the top layer contains 0.5–175%, by volume of the polyester, of filler.

13. The article of claim 12 wherein the underlayer comprises a foamed resin of polyurethane.

14. The article of claim 1 wherein the underlayer comprises a foamed resin of polyurethane.

References Cited

UNITED STATES PATENTS

| | | | |
|---|---|---|---|
| 2,795,523 | 6/1957 | Cobb et al. | 156—94 |
| 3,450,295 | 6/1969 | Weber | 117—2 R X |
| 3,508,951 | 4/1970 | Shimp et al. | 117—75 X |
| 3,217,066 | 11/1965 | Greenspan et al. | 117—161 K X |
| 3,556,831 | 1/1971 | Shinabeck et al. | 117—75 X |
| 3,380,213 | 4/1968 | Hartman et al. | 264—36 X |
| 3,463,749 | 8/1969 | Taft | 117—148 X |
| 3,579,477 | 5/1971 | Vess | 117—148 X |
| 3,578,632 | 5/1971 | Kuhlkamp et al. | 117—148 X |
| 2,888,359 | 5/1959 | Jorgensen et al. | 117—2 R |
| 3,478,791 | 11/1969 | Elmendorf | 117—2 R F |

RALPH HUSACK, Primary Examiner

U.S. Cl. X.R.

117—2 R, 73, 74, 75